INVENTORS
CHARLES R. BARNES
AND CHARLES R. GEESNER

United States Patent Office 3,294,575
Patented Dec. 27, 1966

3,294,575
VAPOR PLATING COPPER
Charles R. Barnes, Medway, and Charles R. Geesner, Waynesville, Ohio, assignors to the United States of America as represented by the Secretary of the Air Force
Filed Dec. 3, 1962, Ser. No. 242,026
1 Claim. (Cl. 117—95)

The invention described herein may be manufactured and used by or for the United States Government for governmental purposes without payment to us of any royalty thereon.

This invention relates to a new apparatus and process for accomplishing the pyrolytic deposition of copper films by vapor plating on the interior surfaces of small and intricate cavities.

Processes that have been followed in the past for forming copper films on substrates have been by vacuum evaporation, sputtering, by pyrolytic deposition from copper acetylacetonate or copper formate and the like. Neither the vacuum evaporation nor the sputtering methods are applicable for the plating of copper on the interior surfaces of fine tubing, waveguides, intricate surfaces, and the like. Copper films that are deposited pyrolitically from copper acetylacetonate or the formate have the disadvantage that they are contaminated with the decomposition products of the orgnic radical of organo-metallic compounds that are used.

The object of the present invention is to provide apparatus and a method for accomplishing the deposition on a substrate of pure metal that is free of oxygen and other deleterious materials on the inside surfaces of small or intricate objects such as tubes, pipes, and the like, made of metal, glass or ceramic of illustratively $\frac{1}{16}$ of an inch inside diameter. The internally plated tubes are used as electronic conductors for waveguides, maser applications, and the like.

The raw materials that are used in the present process are argon, cuprous chloride vapor, hydrogen and ammonia gas. The ammonia gas serves to neutralize and to prevent corrosive action that might be produced by the by-product hydrogen chloride in its conversion into ammonium chloride that is removed from the reaction by its volatility. The reaction involved is $$2Cu_2Cl_2 + 4NH_3 + 2H_2 \rightarrow 4NH_4Cl\ (g) + 4Cu$$

Experimental coatings of copper have been applied to tubing of various materials, such as of stainless steel, the nickel alloy Kovar, the glass Vicor and the like, in the exercise of the present invention. The tubes have increased the electrical energy conductivity in waveguides and in other electronic applications. The trademark Kovar is owned by the Westinghouse Electric Corporation, Pittsburgh, Pennsylvania, and is a glass sealing nickel alloy that consists of 20% nickel, 17% cobalt, 0.2% manganese, and the remainder is iron. The Kovar has a thermal coefficient of expansion that is the same as that of some of the hard glasses.

Figure 1:
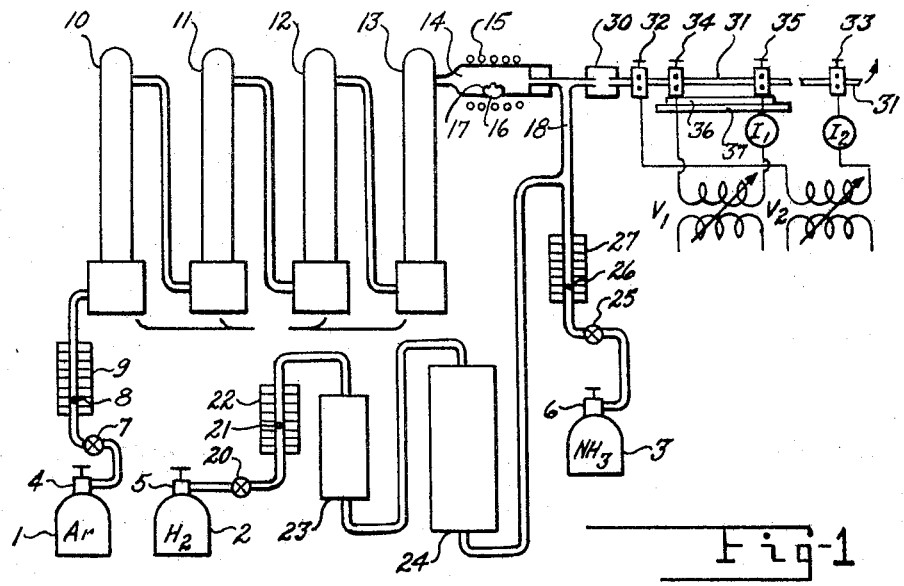
Figure 2:
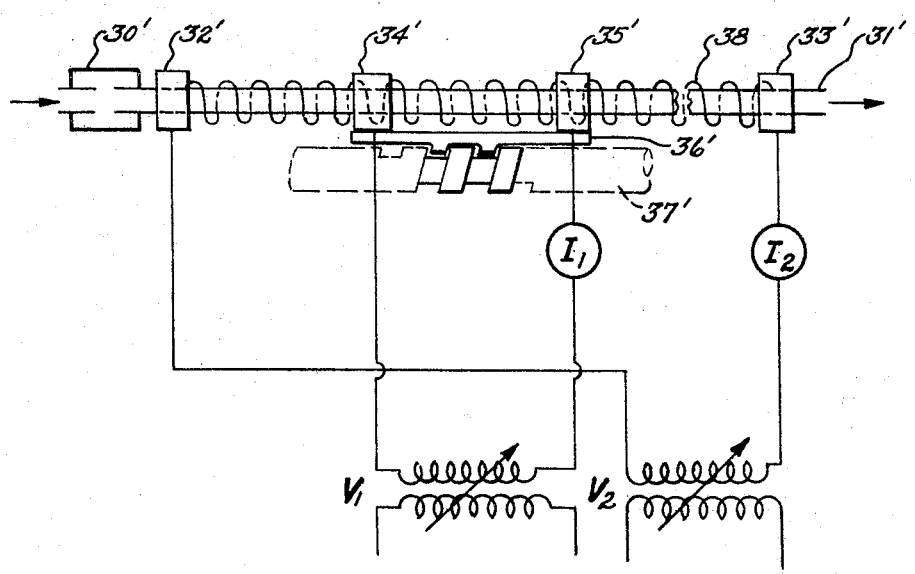

In the accompanying drawings:

FIG. 1 is a diagrammatic showing of the apparatus that is used in following the process that is described herein in coating an electrically conductive tube of steel or brass; and FIG. 2 is an enlarged, fragmentary, diagrammatic view of a modification of the apparatus shown in FIG. 1 for coating the inside of an electrically non-conducting tube of glass, of ceramic, or the like.

The apparatus shown in FIG. 1 of the drawing comprises three pressurized containers 1, 2 and 3. The container 1 contains argon; the container 2 contains hydrogen; and the container 3 is filled with ammonia $NH_3$. The containers 1, 2, and 3 are provided with output valves 4, 5, and 6, respectively, for releasing the contents thereof.

The rate of flow of argon is controlled by the setting of the flow rate adjusting valve 7. The rate of flow of the released argon is indicated by the position of a gravity-depressed float 8 along a flowmeter scale 9. An illustrative rate of flow of the argon gas is about at 600 milliliters per minute. The argon gas is freed of water vapor by passing it through a cascaded plurality of driers 10, 11, 12 and 13 that contain a suitable dehydrating material, such as, anhydrous calcium hydride.

The argon gas passes from the top of the last of the driers 13 onto an evaporator 14. The evaporator 14 is maintained within the temperature range of from 240° C. to 290° C. by a Nichrome winding 15 that is wound around the evaporator 14 and is automatically controlled by thermocouple 16. The evaporator 14 contains a desired quantity of cuprous chloride 17. Cuprous chloride is CuCl or $Cu_2Cl_2$. Cuprous chloride is soluble in hydrochloric acid and in ammonium hydroxide.

The argon gas borne vapors that are discharged from the evaporator 14 carry some of the cuprous chloride 17 to the pipe T 18. The temperature of the cuprous chloride establishes the speed of evaporation of cuprous chloride vapor that is picked up by the argon and that passes through the evaporator 14 into the pipe T 18, where it is mixed with hydrogen and ammonia gas from the pressurized tanks 2 and 3.

The rate of flow of hydrogen from the hydrogen pressure cylinder 2 is controlled by operation of the valve 20 and is indicated by the gravity-depressed float 21 along the flowmeter scale 22. The hydrogen gas flow rate illustratively is about 200 milliliters per minute.

The hydrogen gas is purged of oxygen and water vapor by passing it through the purifier 23 and the molecular sieve drier 24. The purifier 23 catalytically combines hydrogen with any oxygen present to form water vapor, which is absorbed by the molecular sieve drier 24 from the conducted stream of gases. The hydrogen purifier 23 and drier 24 contain a preferred absorbent of oxygen and water vapor, such as the commercially available DEOXO(D). The DEOXO(D) hydrogen gas purifier is available from the Engelhard Industries, Inc., Newark, New Jersey. A preferred hydrogen gas purifying material is supported palladium sponge. The dried and purified hydrogen gas is mixed with the volatile cuprous chloride vapor that is carried by the dried and purified argon gas at the pipe T 18.

The amonia gas within the pressurized tank 3 is the anhydrous grade of 99.9% purity that is commercially available. The rate of flow of the ammonia gas from the pressurized container 3 is controlled by the adjustment of the valve 25 at a flow rate that illustratively is about 50 milliliters per minute, as indicated by the gravity-depressed float 26 along the flowmeter scale 27. The anhydrous ammonia gas is blended in the pipe T 18 with the hydrogen gas and with the argon gas that is laden with the cuprous chloride vapor.

A suitable connection such as the metal, ceramic or rubber tube 30 is inserted in the train between the source of the gases and the work.

Plating electrically conductive metal

In the plating of an electrically conductive tubing, the tube 31 has one of its ends inserted in the rubber tubing 30 and its opposite end discharges into a stack or into a tailings condenser as preferred.

A variac $V_2$ maintains a current $I_2$ for substantially the full length of the metal tube 31. The tube 31 may be made illustratively of stainless steel. The tube 31 illustratively may be 24 inches long and have an inside diameter of 1/16 of an inch.

In the process by which the stainless steel tube 31 has its interior plated with a copper film, heating current from the variac $V_2$ is applied directly to the stainless steel pipe 31 between the pair of fixed contacts 32 and 33. The temperature of the stainless steel tube 31 is maintained within the range of about 150° C. to 250° C.

The pyrolytic deposition of pure copper on the inside of the stainless steel tube 31 is accomplished between the pair of movable contacts 34 and 35, that have impressed therebtween the output from the variac $V_1$.

The temperature range of the plating zone between the pair of movable contacts 34 and 35, with the current $I_1$ impressed thereacross, is within the range of about 450° C. to 550° C., for the satisfactory deposition of a copper film on the inside of the stainless steel pipe 31. The adjustment of the variac $V_1$ permits the maintenance of this copper deposition temperature across illustratively three inches linearly of the pipe 31. The plating zone of three inches between the movable contacts 34 and 35 is illustrative and is maintained during the movement of the contacts 34 and 35. The movable electrical connectors 34 and 35 are mounted for movement along the pipe 31 in a desired manner. Illustratively, the electrical connectors 34 and 35 are attached 3 inches apart to the electrical connector spacer and supporting bar 36 and are moved manually, by a driving force, a screw thread or the like on a supporting means, such as the table or bed support 37 along the length of the pipe 31.

The copper film deposition operation begins with the movable contact 34 adjacent the fixed contact 32. The pair of movable contacts 34 and 35 are moved to the right of the pipe 31, either in steps or as a continuing operation as preferred, at a travel rate of 1 inch linearly of the pipe 31 every 4 minutes during the deposition period. At the stated experimentally determined rate of movement of the movable contacts 34 and 35, it requires 1 and ½ hours for the plating of the entire 24 inches of the interior surface of the metal tube 31. The plating illustratively is about one-half mil thick. One mil is 0.001 of an inch.

*Plating electricallly non-conducting tubing*

In FIG. 2 of the accompanying drawing there is shown an electrically non-conducting glass tube 31' that is illustratively 24 inches long and that has an inside diameter of 1/16 of an inch. The inside surface of the tube 31' is to be coated with a film of copper.

The glass tubing 31' of Vicor, or the like, is maintained at an overall temperature within the range of from about 150° C. to 250° C. Illustratively the glass tube 31' is spirally wound with a helix of gauge 23 Nichrome wire 38, or the like. The variac $V_2$ impresses its current $I_2$ along the length of the resistance wire 38.

The plating zone current output $I_1$ of the variac $V_1$ is impressed across a lesser length, such illustratively as a 3 inch length, of the Nichrome widing 38. The temperature range of the plating zone within the interior of the Vicor glass tubing 31' between the movable terminals 34' and 35' is from about 450° C. to 550° C. The movable pair of terminals 34' and 35' illustratively are spaced 3 inches apart.

The plating operation begins with the terminal 34' adjacent the fixed terminal 32' and continues to the terminal position with the movable terminal 35' adjacent the fixed end terminal 33'. The plating operation is accomplished illustratively in progressive steps of 4 minutes each, as the pair of terminals 34' and 35' are moved stepwise 1 inch at a time along the 24 inch length of the Vicor glass tubing 31' from its input end to its terminal end. As in the previous example, the layer of pure copper that is deposited in film form on the inside of the Vicor glass tubing 31' is about ½ mil thick.

The pair of movable terminals 34' and 35' are spaced a predetermined distance apart by being mounted on a movable electrical connector spacer and supporting means, such as the rack 36' that is moved linearly along the pipe 31' by the operation of a supporting means, such as by the rotation of the pinion 37'.

The pair of movable terminals or connectors 34' and 35' on their mount 36' are moved in steps along the tube 31', of the pair of movable terminals may be mounted on a continuously moving thread 37' that is analogous to the movement of a cutting tool along a lathe, or the like. The overall time for coating 24 inches of Vicor glass tubing is about 1 and ½ hours.

An oven with two heating zones, or three heating zones to include the evaporator 14, may be used, if desired, to replace the variacs $V_1$ and $V_2$, as well as the resistor heating coil 15. In either process the $NH_4Cl$ is recovered by directing its vapor against surface that is maintained well below its solidification temperature of 335° C.

It is to be understod that details of the apparatus shown in FIGS. 1 and 2 of the accompanying drawing, and the described process steps may be modified somewhat in the accomplishing of corresponding results without departing from the scope of the invention that is disclosed herein.

We claim:

The process of applying a coating of copper metal to the interior surface substrate of the hollow object by combining a vapor of the metal as a reactant in stoichiometric proportions with anhydrous hydrogen and ammonia; adding to the combined reactant vapors a chemically inert carrier gas in providing a completely dry flowable gas mixture; heating the substrate surface to be coated; heating a plating zone area of the substrate area to be coated at a metal deposition temperature; passing the gas mixture across the substrate surface plating zone area at the metal deposition temperature according to the reaction $$2Cu_2Cl_2 + 4NH_3 + 2H_2 \rightarrow 4NH_4Cl\ (g) + 4Cu$$

within the temperature range of 450–550° C.; and progressively moving the substrate surface plating zone area at the metal deposition temperature linearly of the object substrate during the application of the metal coating thereto.

References Cited by the Examiner

UNITED STATES PATENTS

| | | | |
|---|---|---|---|
| 2,804,486 | 5/1931 | Wright | 204—211 |
| 2,859,132 | 11/1958 | Novak et al. | 117—107.2 |
| 3,031,338 | 4/1962 | Bourdeau | 117—107.2 |
| 3,201,101 | 8/1965 | Jacques | 118—49.1 |

OTHER REFERENCES

Powell et al.: "Vapor Plating," pub. by John Wiley and Sons, 1955, pp. 13, 14 and 24 relied on. TS 695 B3.

ALFRED L. LEAVITT, *Primary Examiner.*

RICHARD D. NEVIUS, *Examiner.*

A. GOLIAN, *Assistant Examiner.*